(12) United States Patent
Eska

(10) Patent No.: US 10,169,055 B2
(45) Date of Patent: Jan. 1, 2019

(54) ACCESS IDENTIFIERS FOR GRAPHICAL USER INTERFACE ELEMENTS

(71) Applicant: SAP SE, Walldorf (DE)

(72) Inventor: Veit Eska, Heidelberg (DE)

(73) Assignee: SAP SE, Walldorf (DE)

(*) Notice: Subject to any disclaimer, the term of this patent is extended or adjusted under 35 U.S.C. 154(b) by 310 days.

(21) Appl. No.: 15/084,475

(22) Filed: Mar. 30, 2016

(65) Prior Publication Data

US 2017/0286130 A1    Oct. 5, 2017

(51) Int. Cl.
| G06F 3/0481 | (2013.01) |
| G06F 9/451 | (2018.01) |
| G06F 21/31 | (2013.01) |
| G06F 21/62 | (2013.01) |

(52) U.S. Cl.
CPC .......... *G06F 9/451* (2018.02); *G06F 3/04817* (2013.01); *G06F 21/31* (2013.01); *G06F 21/6218* (2013.01)

(58) Field of Classification Search
CPC .... G06F 3/0481; G06F 9/4443; G06F 3/0482; G06F 9/44; G06F 21/31
See application file for complete search history.

(56) References Cited

U.S. PATENT DOCUMENTS

| 9,600,401 B1* | 3/2017 | Haischt | G06F 11/3664 |
| 2009/0164933 A1* | 6/2009 | Pederson | G05B 19/409 |
| | | | 715/772 |

* cited by examiner

*Primary Examiner* — Andrea C Leggett
(74) *Attorney, Agent, or Firm* — Fish & Richardson P.C.

(57) ABSTRACT

Various embodiments of systems, computer program products, and methods to provide access identifiers for graphical user interface (GUI) elements are described herein. In an aspect, a trigger is received to render at least one GUI element on a GUI associated with a display. One or more pre-defined accessibility parameters associated with the at least one graphical user interface element are retrieved. Further, access control check is performed in real time to determine whether the one or more pre-defined accessibility parameters are met. A visual identifier representing an accessibility status is associated to the at least one GUI element based on the access control check. The at least one GUI element is rendered with the visual identifier on the GUI.

20 Claims, 6 Drawing Sheets

ACCESS IDENTIFIERS FOR GRAPHICAL USER INTERFACE ELEMENTS

BACKGROUND

Electronic devices include displays (e.g., graphical user interfaces (GUIs)) for accessing different applications. A GUI may include a number of GUI elements (e.g., graphical icons, graphical tiles and so on) to assist in accessing the applications. The GUI may be designed to convey information to navigate among multi-level command structures to reach and display desired information. Further, an error message may be displayed upon selection of a GUI element when a user is not authorized to access the application or when there is any server connectivity issues or the like. Thereby, an authorization may be checked when the user selects the GUI element corresponding to the application.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide access identifiers for graphical user interface (GUI) elements are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (determining, identifying, receiving, storing, retrieving, and so on) may be performed by a hardware device (e.g., computing system), even if the action may be authorized, initiated or triggered by a user, or even if the hardware device is controlled by a computer program, software, firmware, and the like.

Figure 1:
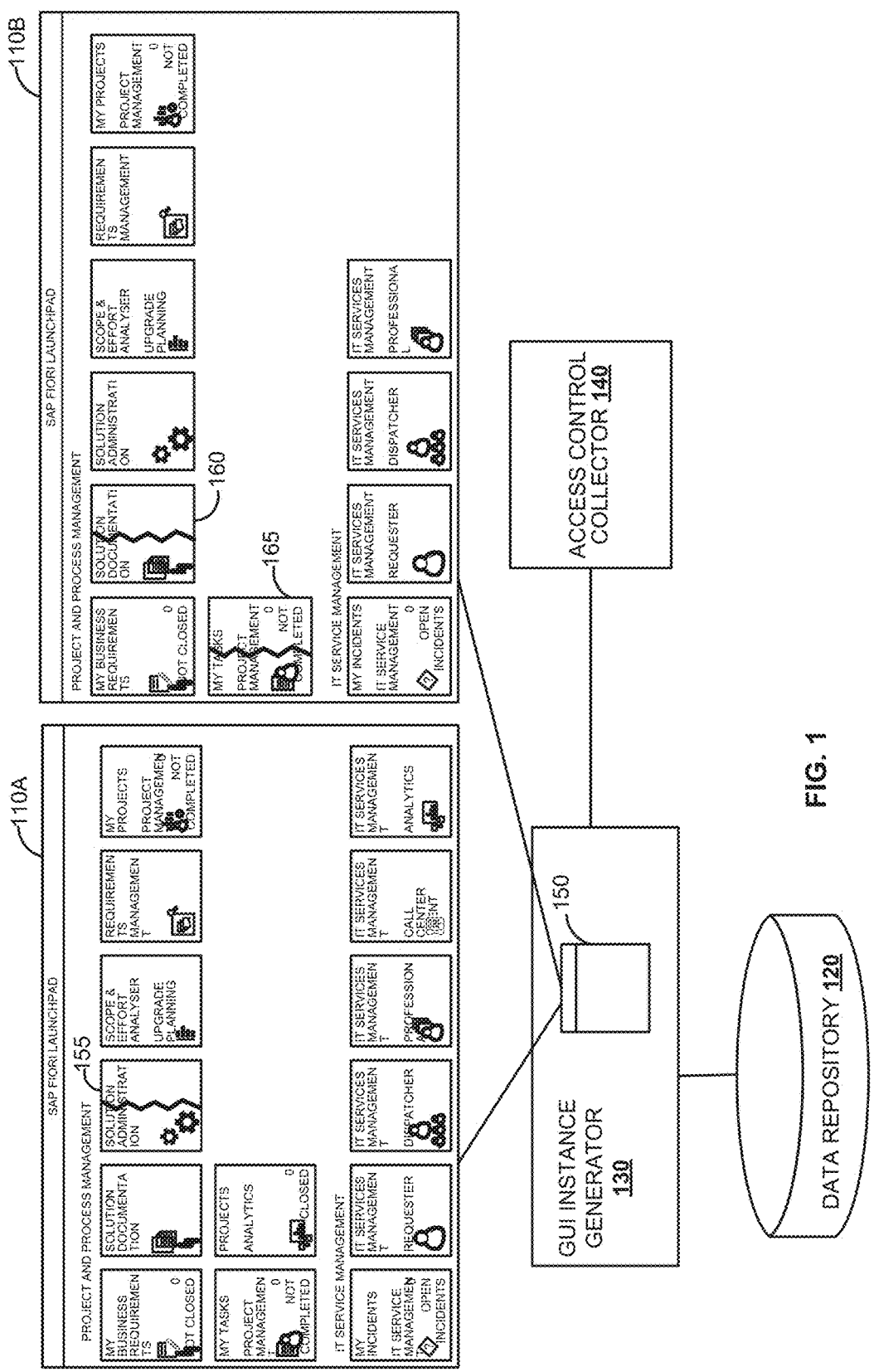
FIG. 1 is a block diagram illustrating a computing environment providing access identifiers for graphical user interface (GUI) elements, according to an embodiment.

FIG. 1 is a block diagram illustrating a computing environment providing access identifiers for graphical user interface (GUI) elements, according to an embodiment. The GUI can be a type of interface allowing users to interact with electronic devices through the GUI elements. In an aspect, the GUI elements are visual indicators representing different functions of applications such as files, folders, shortcuts, documents, gaming application, enterprise resource planning applications, business suite transactional applications, analytical applications and so on. Further, the GUI elements may assist in providing access to data or functional characteristic of different applications. Examples of GUI elements include, but are not limited to graphical icons, graphical tiles and graphics objects on the GUI.

In the example environment shown in FIG. 1, the computing environment may include data repository 120 to store GUI settings associated with different users. For example, a list of the GUI elements, associated with a user, to be displayed are stored in the data repository 120. The list of GUI elements are displayed when a device is turned on (e.g., home page) and/or a GUI element is selected (e.g., a set of GUI elements are displayed upon selection of the GUI element), for instance. Further, the data repository 120 may include pre-defined accessibility parameters or rules to provide access to the applications. For example, an application (e.g., a gaming application) installed in a smartphone may require authorization, interact access, location access and so on for accessing the application. These requirements (e.g., authorization internet access, location access, credentials and so on) can be referred as pre-determined accessibility parameters to ensure successful execution of the application.

In one exemplary embodiment when the GUI is called (e.g., a trigger to render the GUI), a graphical user interface instance (e.g., 150) is generated by GUI instance generator 130 based on the GUI elements associated with a user and the corresponding pre-determined accessibility parameters. The access control collector 140 may determine accessibility information based on the pre-determined accessibility parameters. In the example of the gaming application, the access control collector 140 checks the pre-determined accessibility parameters such as, but are not limited to whether the smartphone has interact connectivity or not and whether the user is authorized to access the gaming application or not.

When the access control collector 140 determines that there is internet connectivity, the GUI element (e.g., graphical icon) corresponding to the gaming application is rendered active. When there is no internet connectivity, the GUI element (e.g., graphical icon) corresponding to the gaming application is rendered inactive. In another example, the access control collector 140 performs authorization check (e.g., check for identifying the user, i.e., login details). When the user is authorized for accessing the gaming application, the GUI element (e.g., graphical icon) corresponding to the gaming application is rendered active. When the user is not authorized, the GUI element (e.g., graphical icon) corresponding to the gaming application is rendered inactive. In one exemplary embodiment, the active and inactive statuses may be graphically represented using different visual indicators or visual identifiers. For example, the active status may be visually indicated by a default graphical icon and the inactive status may be visually indicated by the default icon augmented with an accessibility identifier. The default icon augmented with the accessibility identifier may include, but not limited to a zigzag line, a broken graphical tile and a special symbol on the graphical icon.

In one exemplary embodiment, the users can customize the GUIs elements on the GUI based on users' interest. For example, the GUIs (e.g., 110A and 110B) are associated with two different users. Both the GUIs 110A and 110B includes two groups "project and process management" and "IT service management." However, the number of graphical elements in each of the groups differs between the GUIs 110A and 110B based on customizations provided by the users. In the GUI 110A, there are eight graphical elements under the group "project and process management" and six graphical elements under the group "IT service management." In the GUI 110B, there are seven graphical elements under the group "project and process management" and four graphical elements under the group "IT service management."

In one exemplary embodiment, the GUI elements graphically represents the accessibility statuses of the applications represented by the GUI elements based on the pre-determined accessibility parameters. For example, a graphical element (e.g., solution administration 155) in the GUI 110A includes a zigzag line indicating the user is not authorized to access the application underlying the graphical element (e.g., solution documentation 155). Similarly, the graphical elements (e.g., solution administration 160 and project management 165) in the GUI 110B include zigzag lines indicating the user is not authorized to access the applications underlying the graphical elements (e.g., solution administration 160 and project management 165). Thereby, users may be visually indicated whether they can access the applications through the GUI elements instead of receiving an error message upon attempting to access the application by selecting the GUI element.

Figure 2:
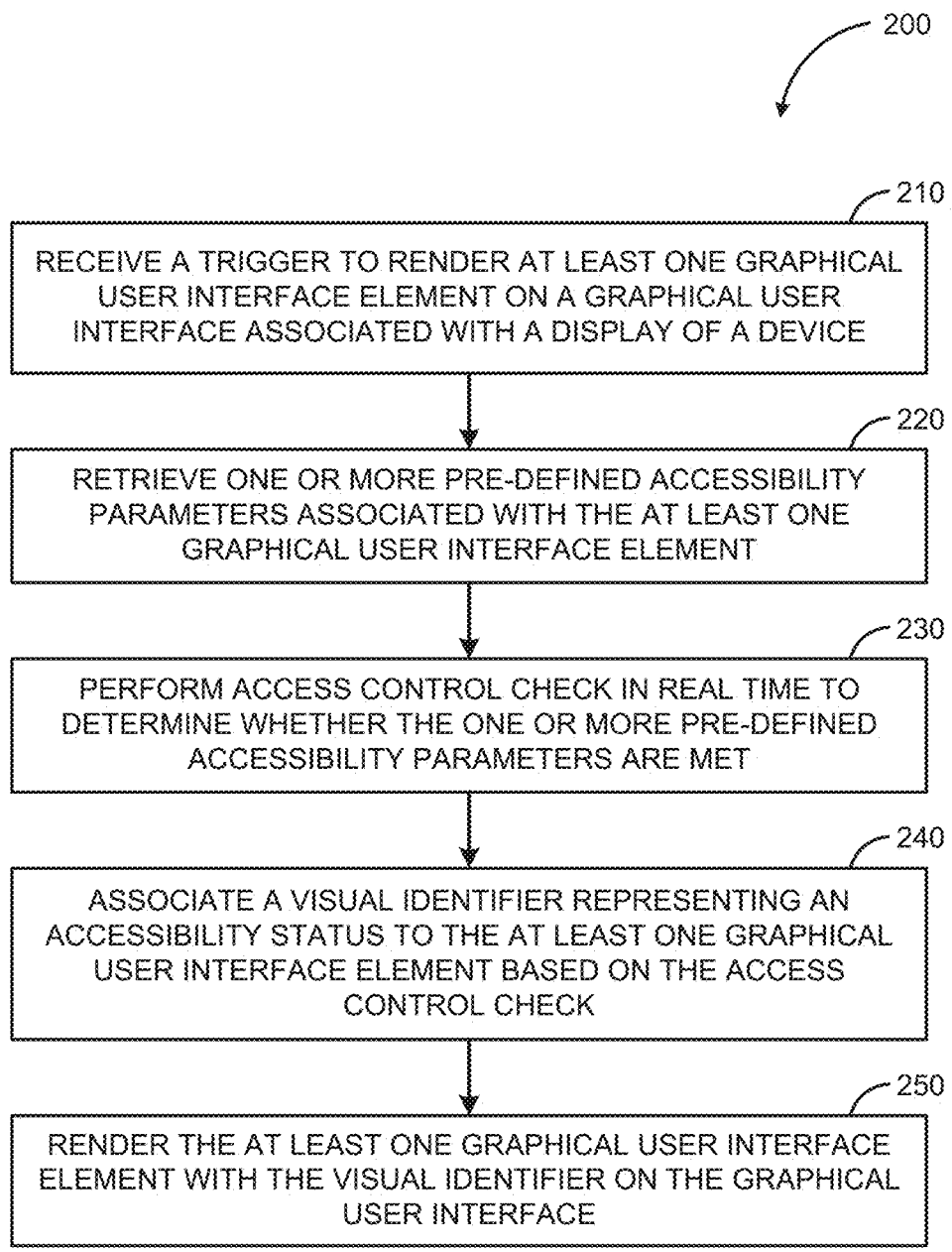
FIG. 2 is a flow diagram illustrating an example process to provide access identifiers for graphical user interface elements, according to an embodiment.

FIG. 2 is a flow diagram illustrating example process 200 to provide access identifiers for graphical user interface elements, according to an embodiment. In one example, graphical tiles in a Launchpad (e.g., SAP® Fiori® Launchpad) are considered as the GUI elements for describing the process 200. However, the described process can be implemented for other types of GUI elements on a GUI. For example, a Launchpad may host applications, and provide the applications with services such as navigation, personalization, embedded support, and application configuration. Further, the Launchpad may display different groups or catalogues (e.g., "project and process management", "information technology (IT) service management", "test management", "job management", and so on). Each group may include multiple graphical tiles on a home page and each graphical tile may represent an application that a user can launch.

At 210, a trigger is received to render at least one GUI element on the GUI associated with a display of a device. In one exemplary embodiment, the trigger can be received when, but is not limited to a device is switched on to display a home page, and a GUI element is selected which may display another set of GUI elements corresponding to the selected GUI element.

At 220, the pre-defined accessibility parameters associated with the at least one GUI element are retrieved. The pre-defined accessibility parameters may include rules associated with application programming interfaces (APIs) such as, but are not limited to a ping, user's credentials, a server connectivity and a network access. The ping can be a computer network administration software utility used to test the reachability of a host on an Internet Protocol (IP) network. The user's credentials can include login credentials (e.g., identity data such as user identifier (ID) and password). The server connectivity may be communication with a database server and a client software. The network access may connect user device to an internet service provider.

At 230, access control check is performed in real time to determine whether the pre-defined accessibility parameters are met. In one exemplary embodiment, the access control check is performed by an access control collector based on the pre-defined accessibility parameters. For example, access control check for a set of graphical tiles on the Launchpad to be displayed is performed. The access control check may include, but is not limited to whether the user is authorized for accessing an application, whether there exist server connectivity, and whether the device is connected to Internet depending on the nature of the application. For example in the Launchpad, the authorization may include information such as, but not limited to a "requirements manager" may have no access to a "scope and effort analyzer" or a "project team member" may not have access to a "project management dashboard." Thereby, accessibility information is determined for the at least one GUI element based on pre-defined accessibility parameters.

At 240, a visual identifier representing an accessibility status is associated with the at least one GUI element based on the access control check. In one exemplary embodiment, the visual identifier includes, but is not limited to graphical representation of active status and inactive status of the GUI element. For example, the active status is visually indicated by a default graphical tile and the inactive status is visually indicated by the default tile augmented with an accessibility identifier. The default tile augmented with the accessibility identifier may include, but is not limited to a zigzag line on the graphical tile, a broken graphical tile, a special graphical symbol on the graphical tile, and flagging the GUI element to indicate inactive status. At 250, the at least one GUI element with the visual identifier is rendered on the GUI. Therefore, the GUI displays the GUI elements associated with the user, where the GUI elements are augmented with real-time accessibility statuses of the underlying applications.

Figure 3:
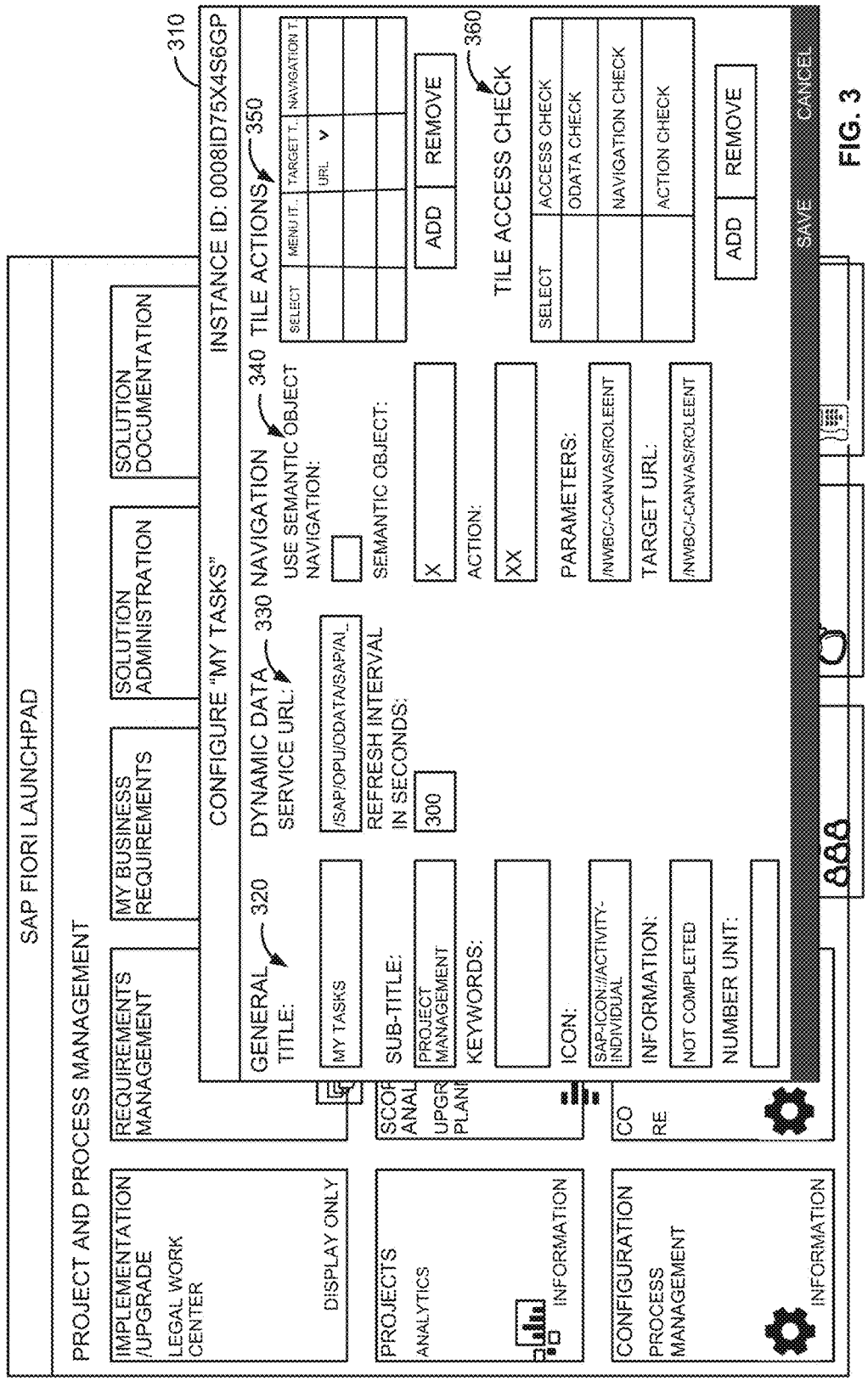
FIG. 3 shows an exemplary graphical user interface (GUI) of a Launchpad providing an option for graphical tiles configuration, according to an embodiment.

FIG. 3 shows an exemplary graphical user interface (GUI) of a Launchpad providing an option for graphical tiles configuration (e.g., 310), according to an embodiment. The GUI displays an option for the graphical tiles configuration. For example, the configuration option may include a general section (e.g., 320), a dynamic data section (e.g., 330), a navigation section (e.g., 340), a table for actions section (e.g., 350) and a table for tile access checks (e.g. 360). The general section (e.g., 320) may include information such as title of the graphical tiles and/or keywords. The dynamic data section (e.g., 330) may include Uniform Resource Identifier (URL) for Open Data Protocol (OData) service by providing the information for the graphical tiles. In the navigation section (e.g., 340), the URL is maintained to navigate to the underlying application, for instance. The table (e.g., 350) may include one or more actions to be performed by the applications associated with the graphical tiles. Further, the URL may include pre-defined accessibility parameters in order to access the application and such pre-defined accessibility parameters is stored in a data repository. Therefore, the pre-defined accessibility parameters may be defined, which are checked when generating a GUI instance in real-time. The tile access checks table (e.g. 360) may include one are more services running during runtime to check the defined parameters in the other sections (e.g. 330, 340 and 350). For example, the OData service defined in the dynamic data section (e.g., 330), connectivity to target URL with parameters defined in the navigation section (e.g., 340) and actions defined in the table for actions section (e.g., 350). Further, there can be additional accessibility checks depending on, but not limited to age of a user and a location (e.g., country specific checks). For example, the age of the user may be considered for providing access to, but not limited to gaming applications, resources such as different database (e.g., movies), and shopping applications (e.g. when the limit of credits is reached).

Figure 4:
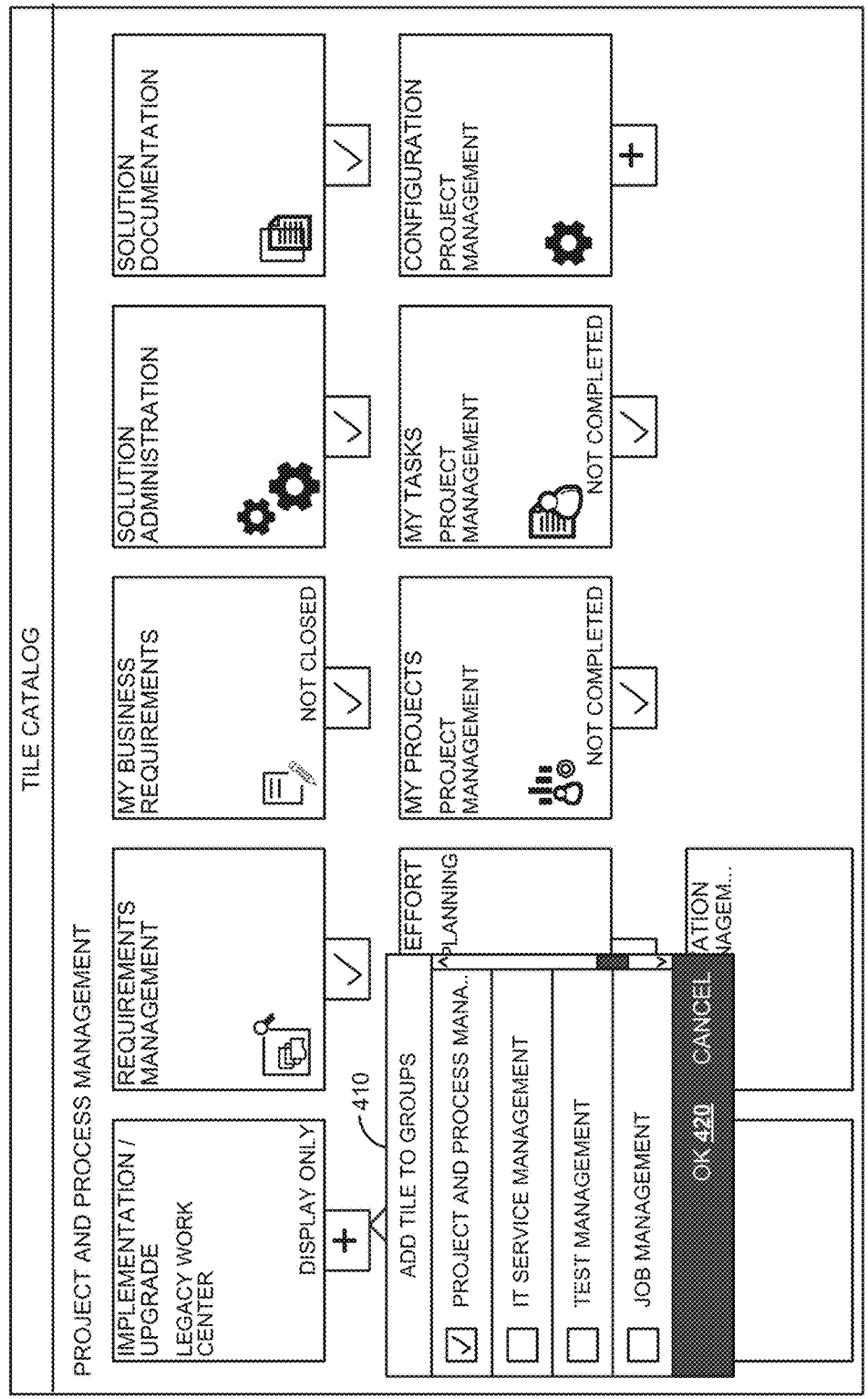
FIG. 4 shows another exemplary graphical user interface (GUI) of a Launchpad illustrating configuration of graphical tiles, according to an embodiment.

FIG. 4 shows another exemplary graphical user interface (GUI) of a Launchpad configuration of graphical tiles, according to an embodiment. The SAP Fiori Launchpad is considered as an exemplary Launchpad to describe configuration of the graphical tiles. The Launchpad may include an option (e.g., 410) to customize or configure a list of GUI elements on the GUI corresponding to a user. For example, graphical tiles on a home page are arranged in groups (e.g., catalogues). The user can personalize the layout of the home page by adding, deleting, reordering, and/or renaming the graphical tiles. The GUI of FIG. 4 shows that more than one group can be selected (e.g., 410). When the user selects "OK" (e.g., 420), the graphical tiles associated with the groups are added. Thereby, each user can configure user's Launchpad. In one exemplary embodiment, graphical tile access identifiers may be provided on the graphical tiles upon confirming addition of the graphical tiles (selecting "OK" 420). The graphical tile access identifiers are determined based on associated pre-defined accessibility parameters (e.g., as specified by the navigation section (e.g., 340 of FIG. 3)), for instance.

In one exemplary embodiment, the access identifier can be assigned to the groups (e.g., catalogues) in Launchpad similar to the graphical tiles. For example, real-tile access identifier can be assigned to the catalogues such as "project and process management", "information technology (IT) service management", "test management", "job management", and the like. Therefore, a user is informed of the accessibility status of the groups.

Figure 5:
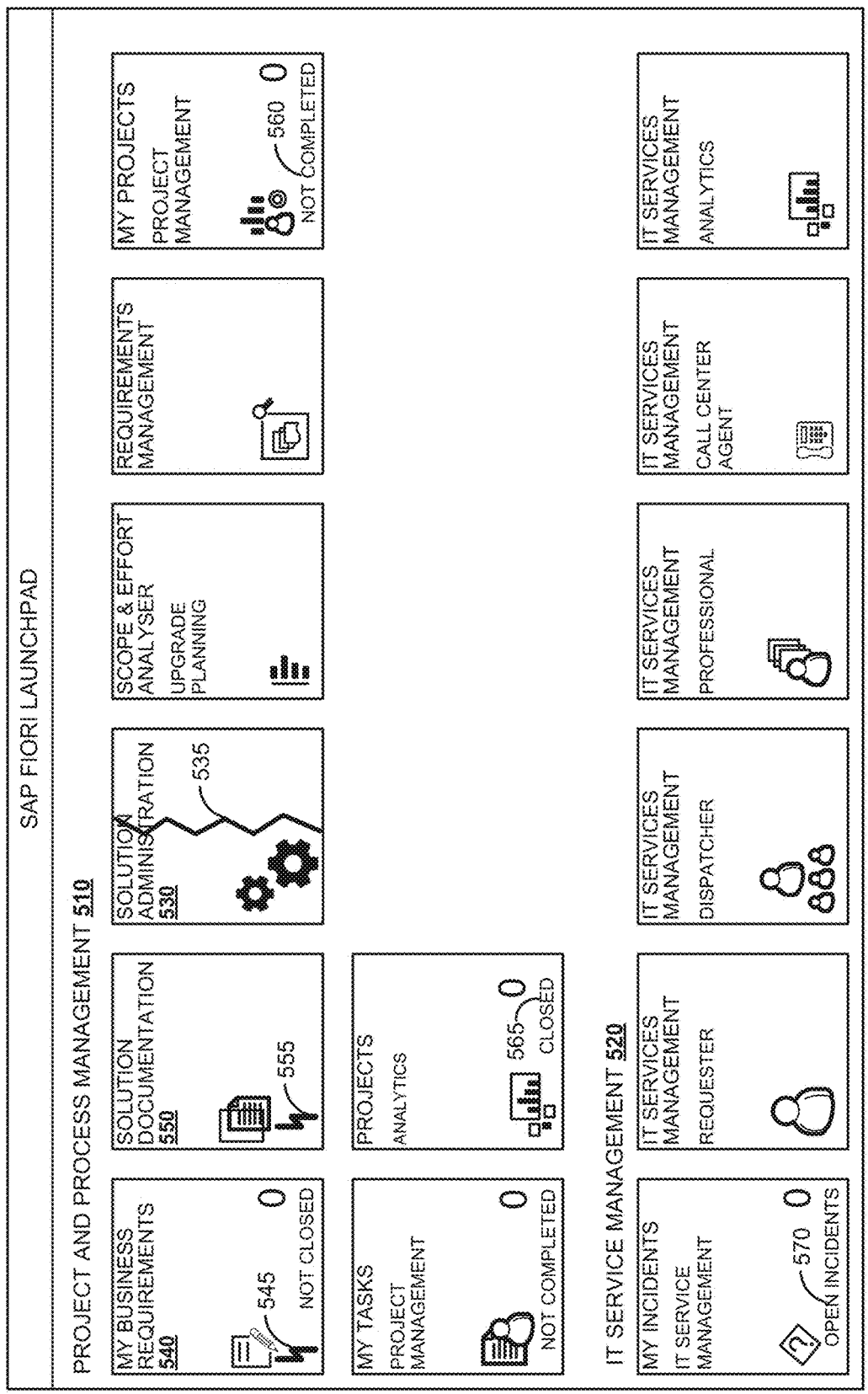
FIG. 5 shows an exemplary graphical user interface (GUI) of an end user view of a Launchpad, according to an embodiment.

FIG. 5 shows an exemplary graphical user interface (GUI) of an end user view of a Launchpad, according to an embodiment. The GUI of the Launchpad of FIG. 5 is generated upon determining accessibility information. The GUI includes a set of graphical tiles associated with a catalog "project and process management" 510 and "information technology (IT) service management" 520. In one exemplary embodiment, the graphical tiles graphically indicate the accessibility information. For example, a graphical tile representing "solution administration" 530 includes a zigzag line (e.g., 535) indicating a user may not be authorized to access the "solution administration" 530. The graphical tiles representing "my business requirements" 540 and "solution documentation" 550 includes a symbol (e.g., 545 and 555) indicating that there is no server connectivity. Therefore, for different pre-defined accessibility parameters, different accessibility identifiers may be assigned to the GUI elements. Thereby, users are provided with real-time accessibility information on the GUI elements. In one exemplary embodiment, the GUI elements are updated with visual identifiers such as, but not limited to "closed" (e.g., 565), "not completed" (e.g., 560) and "open incidents" (e.g., 570) based on change in the GUI (e.g., when a device is switched off).

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
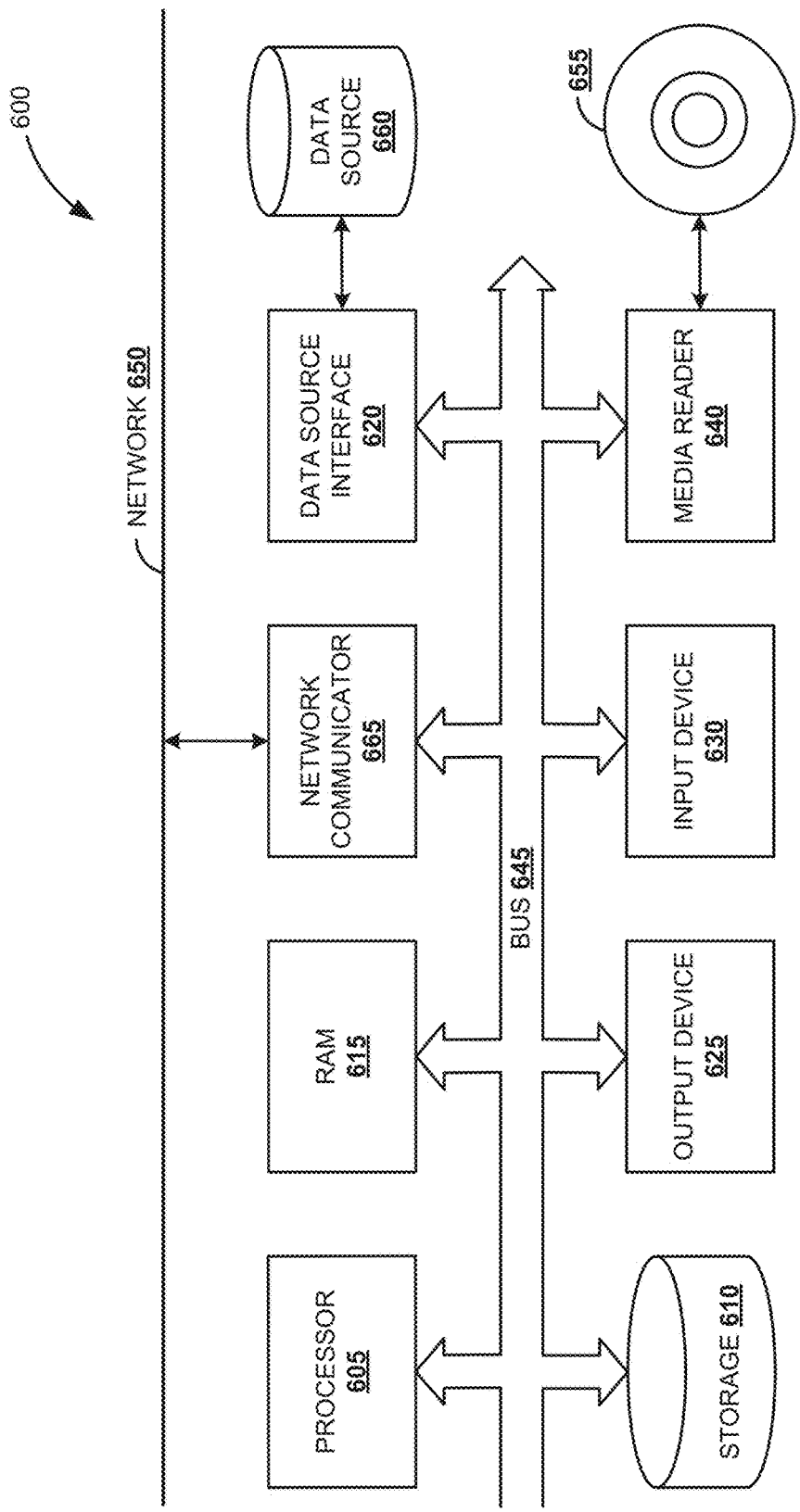
FIG. 6 is a block diagram illustrating an exemplary computer system, according to an embodiment.

FIG. 6 is a block diagram of example computer system 600, according to an embodiment. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. One or more of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments, the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
   receiving a trigger to render at least one graphical user interface element on a graphical user interface associated with a display;
   retrieving one or more pre-defined accessibility parameters associated with the at least one graphical user interface element, wherein retrieving the one or more pre-defined accessibility parameters associated with the at least one graphical user interface element comprises accessing one or more application programming interfaces (APIs) associated with the at least one graphical user interface element, and wherein the one or more APIs returning a set of requirements associated with rendering the triggered at least one graphical user interface element;
   performing an access control check in real time to determine accessibility information associated with an application and corresponding to the pre-defined accessibility parameters, wherein the access control check determines whether the accessibility information meets the one or more pre-defined accessibility parameters based on whether the one or more pre-defined accessibility parameters are met;
   associating a visual identifier representing an accessibility status to the at least one graphical user interface element determined based on the access control check; and
   rendering the at least one graphical user interface element with the visual identifier on the graphical user interface, wherein each of the at least one graphical user interface elements are augmented with the associated visual identifier indicating a real-time accessibility status of the associated graphical user interface element.

2. The non-transitory computer-readable medium of claim 1, wherein the visual identifier comprises one of a graphical representation of active status and a graphical representation of inactive status of the at least one graphical user interface element.

3. The non-transitory computer-readable medium of claim 2, wherein the active status is visually indicated by a default graphical user interface element and the inactive status is visually indicated by the default graphical user interface element augmented with an accessibility identifier.

4. The non-transitory computer-readable medium of claim 1, wherein the one or more pre-defined accessibility parameters comprise from a group consisting of a ping, user's credentials, a server connectivity and a network access.

5. The non-transitory computer-readable medium of claim 1, wherein the at least one graphical user element is a visual indicator to provide access to an application.

6. The non-transitory computer-readable medium of claim 5, wherein the at least one graphical user interface element comprises one of a graphical icon, a graphical tile and a graphical symbol.

7. The non-transitory computer-readable medium of claim 1, wherein the graphical user interface comprises the at least one graphical user interface element associated with a user.

8. A computer implemented method to provide access identifiers for graphical user interface elements, comprising:
   receiving a trigger to render at least one graphical user interface element on a graphical user interface associated with a display;
   retrieving one or more pre-defined accessibility parameters associated with the at least one graphical user interface element, wherein retrieving the one or more pre-defined accessibility parameters associated with the at least one graphical user interface element comprises accessing one or more application programming interfaces (APIs) associated with the at least one graphical user interface element, and wherein the one or more APIs returning a set of requirements associated with rendering the triggered at least one graphical user interface element;
   performing an access control check in real time to determine accessibility information associated with an application and corresponding to the pre-defined accessibility parameters, wherein the access control check determines whether the accessibility information meets the one or more pre-defined accessibility parameters based on whether the one or more pre-defined accessibility parameters are met;
   associating a visual identifier representing an accessibility status to the at least one graphical user interface element determined based on the access control check; and
   rendering the at least one graphical user interface element with the visual identifier on the graphical user interface, wherein each of the at least one graphical user interface elements are augmented with the associated visual identifier indicating a real-time accessibility status of the associated graphical user interface element.

9. The computer implemented method of claim 8, wherein the visual identifier comprises one of a graphical representation of active status and a graphical representation of inactive status of the at least one graphical user interface element.

10. The computer implemented method of claim 9, wherein the active status is visually indicated by a default graphical user interface element and the inactive status is visually indicated by the default graphical user interface element augmented with an accessibility identifier.

11. The computer implemented method of claim 8, wherein the one or more pre-defined accessibility parameters comprise from a group consisting of a ping, user's credentials, a server connectivity and a network access.

12. The computer implemented method of claim 8, wherein the at least one graphical user element is a visual indicator to provide access to an application.

13. The computer implemented method of claim 12, wherein the at least one graphical user interface element comprises one of a graphical icon, a graphical tile and a graphical symbol.

14. The computer implemented method of claim 8, wherein the graphical user interface comprises the at least one graphical user interface element associated with a user.

15. A computing system to provide access identifiers for graphical user interface elements, comprising:
   at least one processor; and
   one or more memory devices communicative with the at least one processor, wherein the one or more memory devices store instructions to:
      receiving a trigger to render at least one graphical user interface element on a graphical user interface associated with a display;
      retrieving one or more pre-defined accessibility parameters associated with the at least one graphical user interface element, wherein retrieving the one or more pre-defined accessibility parameters associated with the at least one graphical user interface element comprises accessing one or more application programming interfaces (APIs) associated with the at least one graphical user interface element, and wherein the one or more APIs returning a set of requirements associated with rendering the triggered at least one graphical user interface element;
      performing an access control check in real time to determine accessibility information associated with an application and corresponding to the pre-defined accessibility parameters, wherein the access control check determines whether the accessibility information meets the one or more pre-defined accessibility parameters based on whether the one or more pre-defined accessibility parameters are met;
      associating a visual identifier representing an accessibility status to the at least one graphical user interface element determined based on the access control check; and
      rendering the at least one graphical user interface element with the visual identifier on the graphical user interface, wherein each of the at least one graphical user interface elements are augmented with the associated visual identifier indicating a real-time accessibility status of the associated graphical user interface element.

16. The computing system of claim 15, wherein the visual identifier comprises one of a graphical representation of active status and a graphical representation of inactive status of the at least one graphical user interface element.

17. The computing system of claim 16, wherein the active status is visually indicated by a default graphical user interface element and the inactive status is visually indicated by the default graphical user interface element augmented with an accessibility identifier.

18. The computing system of claim 15, wherein the one or more pre-defined accessibility parameters comprise from a group consisting of a ping, user's credentials, a server connectivity and a network access.

19. The computing system of claim 15, wherein the at least one graphical user interface element comprises one of a graphical icon, a graphical tile and a graphical symbol.

20. The computing system of claim 15, wherein the graphical user interface comprises the at least one graphical user interface element associated with a user.

\* \* \* \* \*